United States Patent
Hostettler et al.

(10) Patent No.: US 12,426,988 B2
(45) Date of Patent: Sep. 30, 2025

(54) THREE-DIMENSIONAL ORTHODONTIC RETAINER AND METHOD FOR MAKING A THREE-DIMENSIONAL ORTHODONTIC RETAINER

(71) Applicants: Juerg Hostettler, Huttwil (CH); Jonas Hostettler, Huttwil (CH)

(72) Inventors: Juerg Hostettler, Huttwil (CH); Jonas Hostettler, Huttwil (CH)

(*) Notice: Subject to any disclaimer, the term of this patent is extended or adjusted under 35 U.S.C. 154(b) by 552 days.

(21) Appl. No.: 17/500,074

(22) Filed: Oct. 13, 2021

(65) Prior Publication Data
US 2022/0031427 A1 Feb. 3, 2022

Related U.S. Application Data

(62) Division of application No. 16/462,232, filed as application No. PCT/IB2017/057161 on Nov. 16, 2017, now Pat. No. 12,364,575.

(51) Int. Cl.
*B33Y 50/02* (2015.01)
*A61C 5/00* (2017.01)
(Continued)

(52) U.S. Cl.
CPC ............... *A61C 5/007* (2013.01); *A61C 7/08* (2013.01); *B22F 10/28* (2021.01); *B33Y 10/00* (2014.12);
(Continued)

(58) Field of Classification Search
CPC ........... A61C 5/007; A61C 7/08; A61C 13/34; A61C 2201/002; A61C 13/0022;
(Continued)

(56) References Cited

U.S. PATENT DOCUMENTS

| 4,516,938 A | 5/1985 | Hall |
| 4,798,534 A * | 1/1989 | Breads ............... A61C 13/0003 433/213 |

(Continued)

FOREIGN PATENT DOCUMENTS

| CN | 101147696 A | 3/2008 |
| CN | 101559006 A | 10/2009 |

(Continued)

OTHER PUBLICATIONS

Tajima et al., Electropolishing of CP Titanium and Its Alloys in an Alcoholic Solution-based Electrolyte, Apr. 2008, retrieved from— https://www.researchgate.net/publication/5315844_Electropolishing_of_CP_Titanium_and_Its_Alloys_in_an_Alcoholic_Solution-based_Electrolyte, 9 pages (Year: 2008).*

(Continued)

*Primary Examiner* — Yongjia Pan
(74) *Attorney, Agent, or Firm* — Donald J. Ersler (57) ABSTRACT

The invention relates to a three-dimensional orthodontic retainer (2) and to a method for producing such a retainer (2) in which the three-dimensional orthodontic retainer (2) is matched to the exact shape of the adjacent teeth (3) and is produced from a blank (1) in such a manner that the physical properties of the material of the remaining part of the blank (1) are unchanged in the retainer (2). The method for producing the three-dimensional orthodontic retainer (2) comprises the following method steps: creating three-dimensional model of the structure of the patient's teeth (3); designing a customised, precisely fitting model of the retainer (2); producing the retainer (2) on the basis of the designed 3D model by computer-controlled deposition or application of material.

8 Claims, 8 Drawing Sheets

(51) Int. Cl.
*A61C 7/08* (2006.01)
*B22F 10/28* (2021.01)
*B33Y 10/00* (2015.01)
*B33Y 70/00* (2020.01)
*B33Y 80/00* (2015.01)
*B22F 10/50* (2021.01)
*B22F 10/80* (2021.01)

(52) U.S. Cl.
CPC ............... *B33Y 50/02* (2014.12); *B33Y 70/00* (2014.12); *B33Y 80/00* (2014.12); *B22F 10/50* (2021.01); *B22F 10/80* (2021.01); *B22F 2301/205* (2013.01)

(58) Field of Classification Search
CPC . A61C 7/002; A61C 13/0015; A61C 13/0018; A61C 7/12; A61C 13/0019; B22F 10/28; B22F 10/50; B22F 10/80; B22F 2301/205; B23K 26/342; B33Y 10/00; B33Y 50/02; B33Y 70/00; B33Y 80/00; Y02P 10/25
See application file for complete search history.

(56) References Cited

U.S. PATENT DOCUMENTS

| | | | |
|---|---|---|---|
| 6,132,209 A | 10/2000 | Devanathan et al. | |
| 6,694,212 B1 * | 2/2004 | Kennedy | A61C 13/0004 264/16 |
| 7,943,068 B2 * | 5/2011 | Panzera | A61K 6/20 264/16 |
| 8,992,215 B2 * | 3/2015 | Chapoulaud | A61C 7/146 433/24 |
| 11,534,974 B2 * | 12/2022 | O'Leary | B33Y 10/00 |
| 2002/0010568 A1 * | 1/2002 | Rubbert | A61C 7/146 703/6 |
| 2002/0025503 A1 * | 2/2002 | Chapoulaud | A61C 7/146 700/98 |
| 2002/0137002 A1 * | 9/2002 | Bodenmiller | A61C 13/0004 433/51 |
| 2004/0214128 A1 * | 10/2004 | Sachdeva | A61C 7/00 433/24 |
| 2005/0089822 A1 * | 4/2005 | Geng | G16Z 99/00 433/167 |
| 2005/0181332 A1 | 8/2005 | Sernetz et al. | |
| 2006/0008774 A1 * | 1/2006 | Orth | A61C 13/0022 433/202.1 |
| 2006/0093982 A1 * | 5/2006 | Wen | A61C 7/08 433/6 |
| 2006/0177789 A1 * | 8/2006 | O'Bryan | A61C 7/08 433/18 |
| 2010/0268363 A1 * | 10/2010 | Karim | A61C 13/0022 700/98 |
| 2010/0324715 A1 * | 12/2010 | Yang | B22F 10/28 700/98 |
| 2010/0330535 A1 * | 12/2010 | Adusimilli | A61C 17/036 134/28 |
| 2011/0004331 A1 * | 1/2011 | Cinader, Jr. | B33Y 80/00 700/98 |
| 2011/0129786 A1 * | 6/2011 | Chun | A61C 7/08 29/896.11 |
| 2013/0295515 A1 * | 11/2013 | Musich | A61C 5/007 433/18 |
| 2016/0058527 A1 | 3/2016 | Schumacher | |
| 2016/0256243 A1 | 9/2016 | Kim et al. | |
| 2017/0100214 A1 * | 4/2017 | Wen | G16H 30/20 |
| 2017/0112594 A1 * | 4/2017 | Hilliard | A61C 7/08 |
| 2017/0360534 A1 * | 12/2017 | Sun | C08L 75/04 |
| 2017/0367792 A1 * | 12/2017 | Raby | A61C 7/20 |
| 2018/0206939 A1 * | 7/2018 | Kim | B33Y 80/00 |
| 2020/0060794 A1 * | 2/2020 | Pappas | A61C 8/0048 |

FOREIGN PATENT DOCUMENTS

| | | | | |
|---|---|---|---|---|
| CN | 103405276 A | | 11/2013 | |
| CN | 204501022 U | | 7/2015 | |
| DE | 102005059922 B4 | * | 3/2010 | ............... A61C 7/00 |
| EP | 1786353 B1 | * | 12/2013 | ............... A61C 7/002 |
| JP | 201181844 A | * | 4/2011 | ............... G06F 17/50 |
| WO | WO-2012140021 A2 | * | 10/2012 | ............... A61C 11/00 |
| WO | 2014/008583 A1 | | 1/2014 | |
| WO | 2015177235 A1 | | 11/2015 | |

OTHER PUBLICATIONS

Masafumi Kikuchi and Osamu Okuno, Machinability Evaluation of Titanium Alloys, 2004, retrieved from—https://www.jstage.jst.go.jp/article/dmj1982/23/1/23_1_37/_pdf/-char/ja, 9 pages (Year: 2004).*

S A Thompson, An overview of nickel-titanium alloys used in dentistry, Dec. 24, 2001, retrieved from—https://onlinelibrary.wiley.com/doi/10.1046/j.1365-2591.2000.00339.x, 1 page (Year: 2001).*

Jaafar Abduo, Karl Lyons, and Mohammed Bennamoun, Trends in Computer-Aided Manufacturing in Prosthodontics: A Review of the Available Streams, Apr. 8, 2014, retrieved from—https://www.hindawi.com/journals/ijd/2014/783948/, 16 pages (Year: 2014).*

Are your brackets "perfectly" positioned?, Aug. 16, 2007, retrieved from—https://www.archwired.com/phpbb2/viewtopic.php?f=13&t=20836&SID=9b34f98c23094e76f59bcd9a4eb1dde8&view=print, 4 pages (Year: 2007).*

* cited by examiner

THREE-DIMENSIONAL ORTHODONTIC RETAINER AND METHOD FOR MAKING A THREE-DIMENSIONAL ORTHODONTIC RETAINER

The present invention relates to a three-dimensional orthodontic retainer according to the preamble of patent claim 1 and to the method for producing a three-dimensional orthodontic retainer.

Orthodontic retainers are well known in the state of art. They are often used after completing orthodontic treatment to keep the teeth in the correct position and stabilize the position of these teeth. A retainer is typically a longitudinally shaped rod made of metal, often of a wire, wherein two or more adjacent teeth are connected together, as shown for example in DE 20202004419 U1. An essential requirement for the retainer is the best possible adjustment to the shape of the adjacent teeth. On the one hand, with an inaccurately shaped wire there is a risk that it will be bent elastically when the retainer is attached to the teeth. Any bending of the wire from its rest position leads to mechanical stress and therefore possibly to an unwanted movement of the teeth. Another effect of such a distortion is a permanent tension which, when the jaw and teeth move, may cause the retainer to dislodge or break, which will require it to be replaced. On the other hand, it is particularly important for the comfort of the wearer of the retainer that the wire protrudes from the teeth as little as possible and is as close as possible to the teeth over the entire length. Conventional orthodontic retainers consist of a single or multi-spring braided wire that is manually bent by the dental technician and adjusted to fit to the individual shape of the patient's teeth. This is a cumbersome job that can only be done with limited precision, even if elaborated by experienced dental technicians. In particular, the wire can not be bent very precisely into the interdental spaces, as this may cause it to break. To make matters worse, any plastic deformation of the wire creates residual stresses and nano- or microscopic structural defects and micro-cracks in the material, which weaken the material and can lead to premature failure of the retainer. Although a heat treatment can be used to remove these defects, this adds extra time and energy and may even require another machine. Moreover, such a heat treatment can only approximately restore the original state of the material prior to deformation. US 2004/0072120 describes a method for producing an orthodontic retainer wherein three-dimensional intraoral structures are detected using a scanning device. The collected data is then transferred to a 3D CAD model, based on which a contour-accurate wire is designed and manufactured by means of a wire bending machine. Although a high accuracy of fit of the retainer is achieved with this computerized method, the disadvantages of plastic deformation of the material are not eliminated. In WO 2014/140013 another method for producing an orthodontic retainer is introduced, wherein intraoral structures are detected with scanning devices for creating a 3D model of the teeth. To produce the retainer, the wire is cut out of a metal sheet by means of laser cutting or wire erosion. For this retainer at least one of the sides of the retainer obtained, corresponds to a plane of the original sheet metal. Therefore only retainer with flat sides can be made from a flat sheet. This is not ideal for the function of the retainer as well as for the comfort of the wearer. First, the edges, which are caused by the cutting in the sheet, protrude and then have to be sanded and finished. Secondly, it is ideal if the wire is fixed at a certain height between the base and the upper end of the enamel, this height being different for each tooth and thus not located on the same plane. For example, it is advantageous if the wire protrudes from the tooth as little as possible, so that it does not disturb the wearer. This can be achieved if it runs along the local recesses on the surface of the respective tooth, and certainly not over the protruding zones. In addition, occlusal contact points should be avoided by the retainer as much as possible to avoid biting the retainer. Also for incisors and canines, it must be avoided that the retainer gets in the way of tooth contact between the maxillary teeth and the lower teeth. Even extreme movements of the jaw should be considered to ensure that the retainer can not interfere with any physically possible movement of the dentition. The corresponding contact points must therefore be avoided as well as possible by the retainer. Since the most favorable positions for the application of the wire are never on the same level, a planar retainer made of a sheet is therefore not optimal. It is much more advantageous if the retainer is designed in all three dimensions, so that it can be optimally adjusted to the surface of the teeth in all directions. For this reason WO 2014140013 suggests to cut out the retainer from a curved sheet, so that the retainer is formed in three dimensions. However, the initial bending of the sheet is an additional step in the process, requiring an additional machine, and in addition a specific method must be used for cutting from a curved sheet. Finally, the problem of weakening the material due to the deformation of the material also occurs with the initial bending of the sheet.

The object of the present invention is to provide a three-dimensional orthodontic retainer and an improved method for producing a three-dimensional orthodontic retainer so that the advantages of the known retainers and methods for their production are maintained, where the starting material of the three-dimensional orthodontic retainer is worked directly into the desired final form without deformation or other alterations in the material properties. At the same time, the retainer should have the least possible effect on the functions using the jaw such as eating, laughing, and on the aesthetics of the teeth.

This object is achieved by a three-dimensional orthodontic retainer according to patent claim 1 and by a method for producing a three-dimensional orthodontic. Further features and embodiments are shown in the claims and the advantages thereof are explained in the following description.

Figure 1:
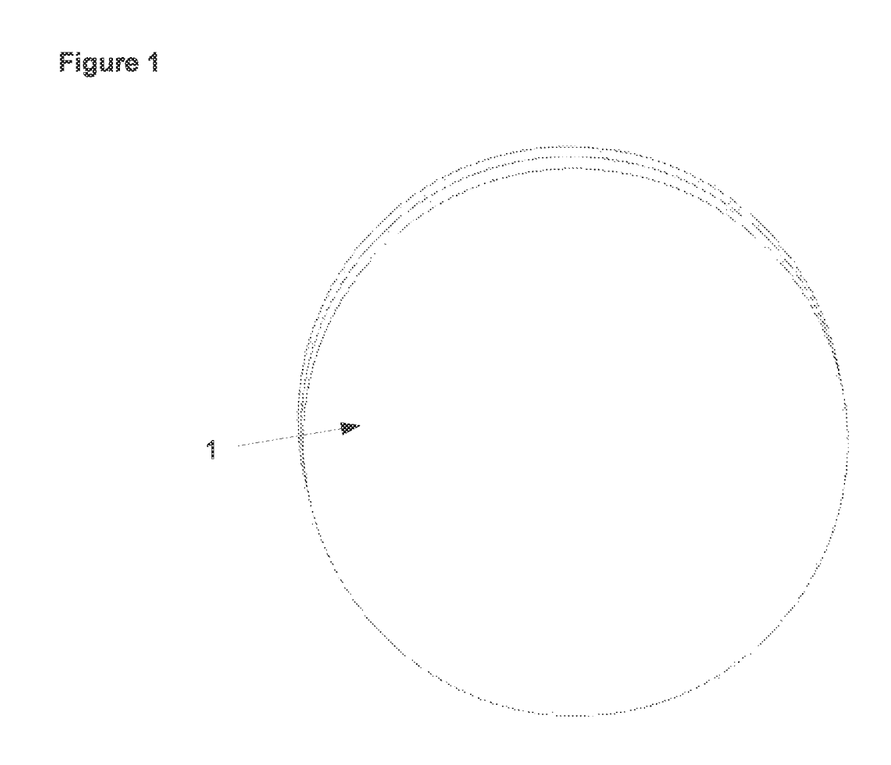
FIG. 1 raw piece
Figure 2A:
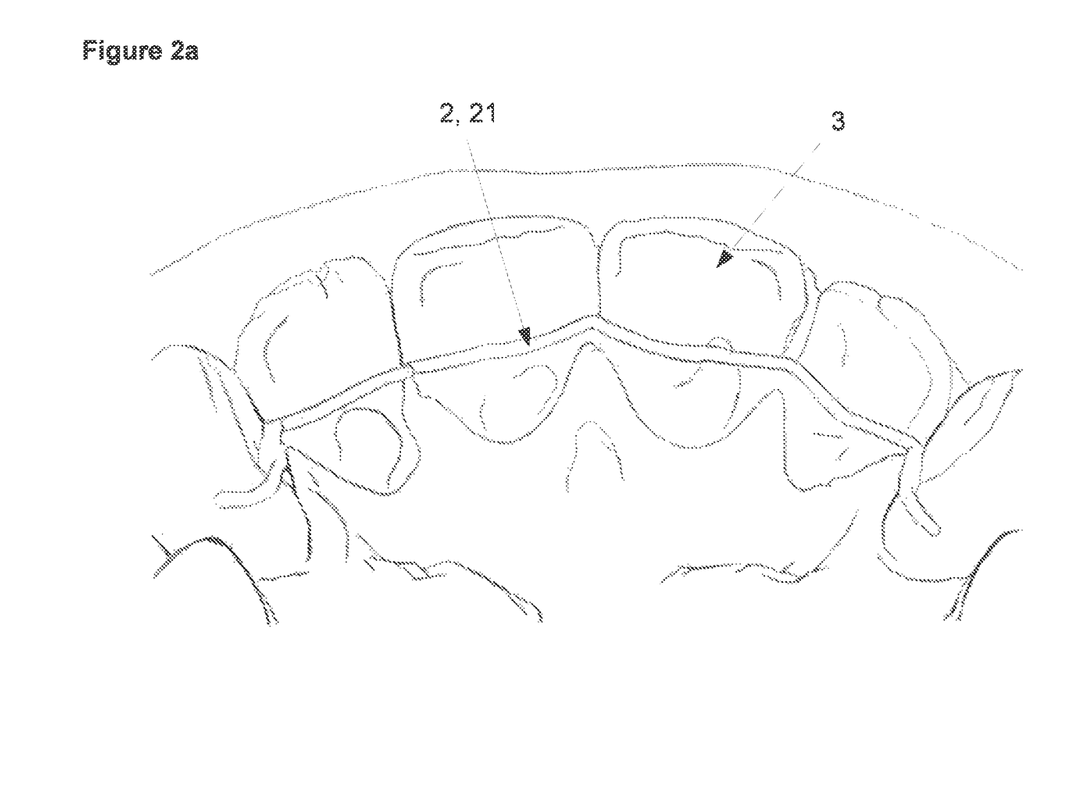
FIG. 2a-b manufactured three-dimensional orthodontic retainer, on the upper jaw
Figure 2B:
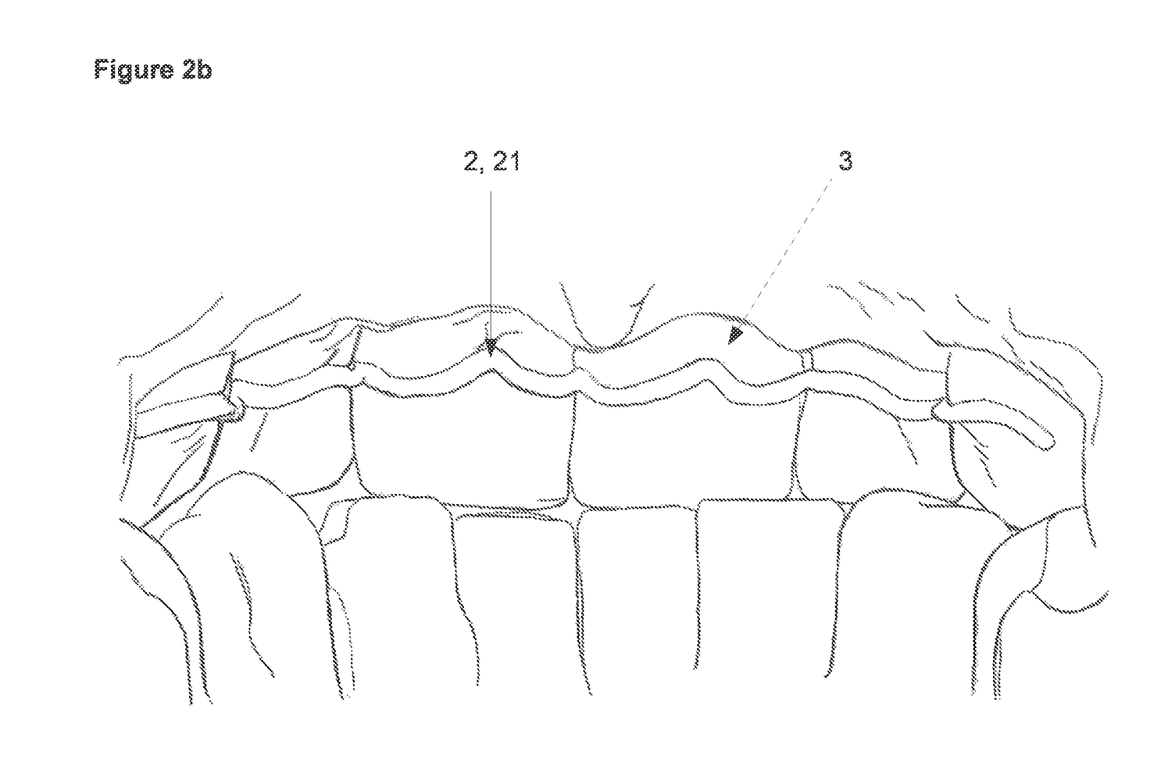

For the production of a three-dimensional orthodontic retainer (2) according to the invention, a biocompatible material is preferred as the starting material, which contains as few allergens as possible. Suitable materials are metal, metal alloys such as Ti—Mo or Ti-6AL-4V (titanium grade 5 ELI, as used in medical technology), ceramic materials (such as Zircon), plastics or any combination of such materials. In order to avoid problems for the wearer, it is useful if the starting material does not contain substances such as nickel, which are known to cause allergic reactions. The present retainer (2) is made of a raw material (1), which may be in the form of a raw piece (1). The raw piece (1) may have any shape, as long as it is large enough that a retainer (2) can be worked out of it. No surface of the raw piece (1) needs to correspond to a side of the manufactured retainer (2), since the exact fit of the retainer (2) can be achieved by the manufacturing process alone. Preferably the raw piece (1) is a standard plate having a predetermined thickness and a lateral extent greater than that of the finished retainer (2) (FIG. 1). The three-dimensional orthodontic retainer (2) made from the raw piece (1) has at least one elongated wire (21) which connects and stabilizes two or more adjacent teeth (3) (FIGS. 2a-b). According to the invention, the shape and the diameter of the retainer (2) are formed individually and specifically for each case allowing it to be adjusted to the exact shape of the adjacent teeth (3) of a patient at least locally. In the preferred embodiment, the retainer (2) has an arbitrary 3-dimensional shape and runs along the local recesses of the surface of the respective tooth (3). This allows for optimal placement of the retainer (2) on the denture, which is crucial for both the function of the retainer (2) and for the comfort of the wearer. On the one hand, for the effectiveness of the retainer (2), the elongated wire (21) must precisely affect the specific zones of the teeth (3) determined by the dentist and, at the same time, occlusal contact points should be avoided when extreme movements of the jaware taken into account. On the other hand, it is important for the comfort of the wearer that the retainer (2) protrudes from the teeth (3) as little as possible and fits as closely as possible over the entire length. The elongated wire (21) includes a cross section having a flat portion and a curved portion, a length of said flat portion is greater than a thickness of said cross section measured from said flat portion to a top of said curved portion, said flat portion is located opposite said curved portion. The retainer (2) essentially has a curved, flattened or tapered profile, and the flat side of the profile faces the teeth.

An additional essential feature of the present retainer (2) is its nano- or microstructure which is identical to the nano- or microstructure of the raw piece (1). Retainers (2) are usually thinner than 1 millimeter and still have to withstand the chemical and physical stress in the mouth for years. The oral environment is moist and warm, and during chewing, retainers (2) are subjected to numerous pressure and tension cycles. Since the properties of a material, in particular the fatigue strength, depend strongly on its nano- or microstructure, it is crucial for the durability of the retainer (2) that the ideal nano- or microstructure achieved the manufacturer of the raw piece (1) is preserved during the production process. This applies to advanced materials such as shape memory alloys to a greater extent. Shape memory properties are based on a particular arrangement of atoms in a regular pattern, where defects such as dislocations and twinning of the crystal lattice have a critical impact. According to the invention, it is thus provided that in the manufacturing process of the present retainer (2) the nano- or microstructure remains unaffected so that no additional defects are generated.

Figure 3A:
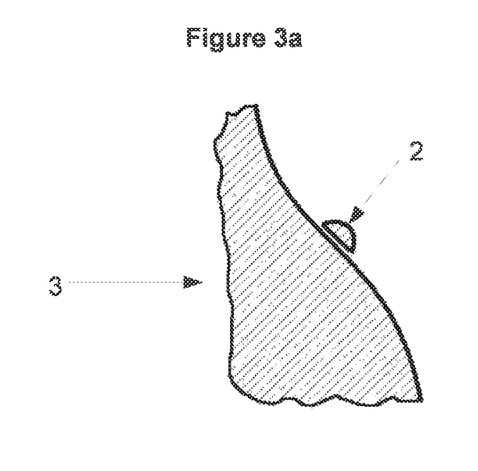
FIG. 3a semicircular profile of the retainer
Figure 3B:
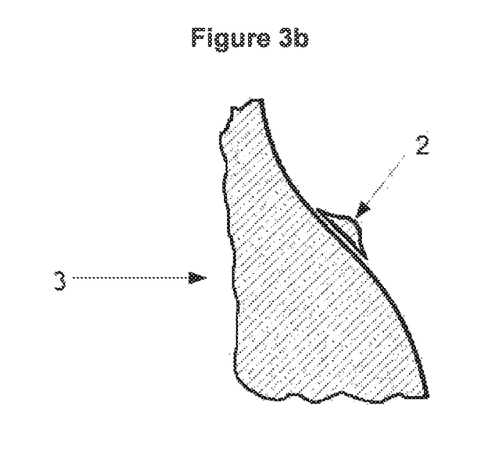
FIG. 3b retainer with elongated, tapered profile

In a possible embodiment, the elongated wire (21) of the retainer (2) essentially has a semicircular profile, wherein the approximately flat side of the profile faces the respective tooth (3) and the rounded side faces the lip (for a labial retainer (2)) or the tongue (for a lingual retainer (2)) (FIG. 3a). Thus, the retainer (2) has a stable contact surface with the teeth (3), on the one hand, allowing optimal attachment to the teeth and, on the other hand, has a tongue or lip-protecting outer surface. In another embodiment, the elongated wire (21) of the retainer (2) has an elongated profile forming a tapered guide surface (FIG. 3b). Thus, the contact area between the retainer (2) and the tooth (3) is even greater and the retainer (2) is anchored more firmly to the tooth (3). With the flattened profile, the retainer (2) also protrudes less so that it feels more comfortable to the wearer and reduces the potential for food to get stuck in the corners between the retainer (2) and the tooth (3). This profile shape is also suitable for creating guide surfaces that taper off on canine teeth.

Figure 4A:
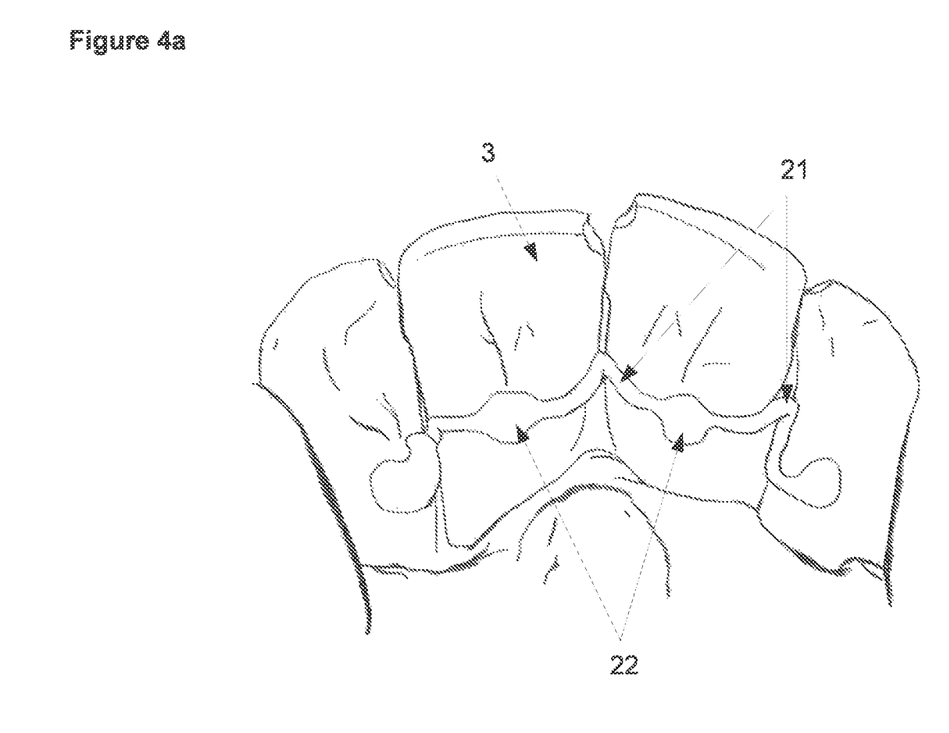
FIG. 4a retainer with fasteners
Figure 4B:
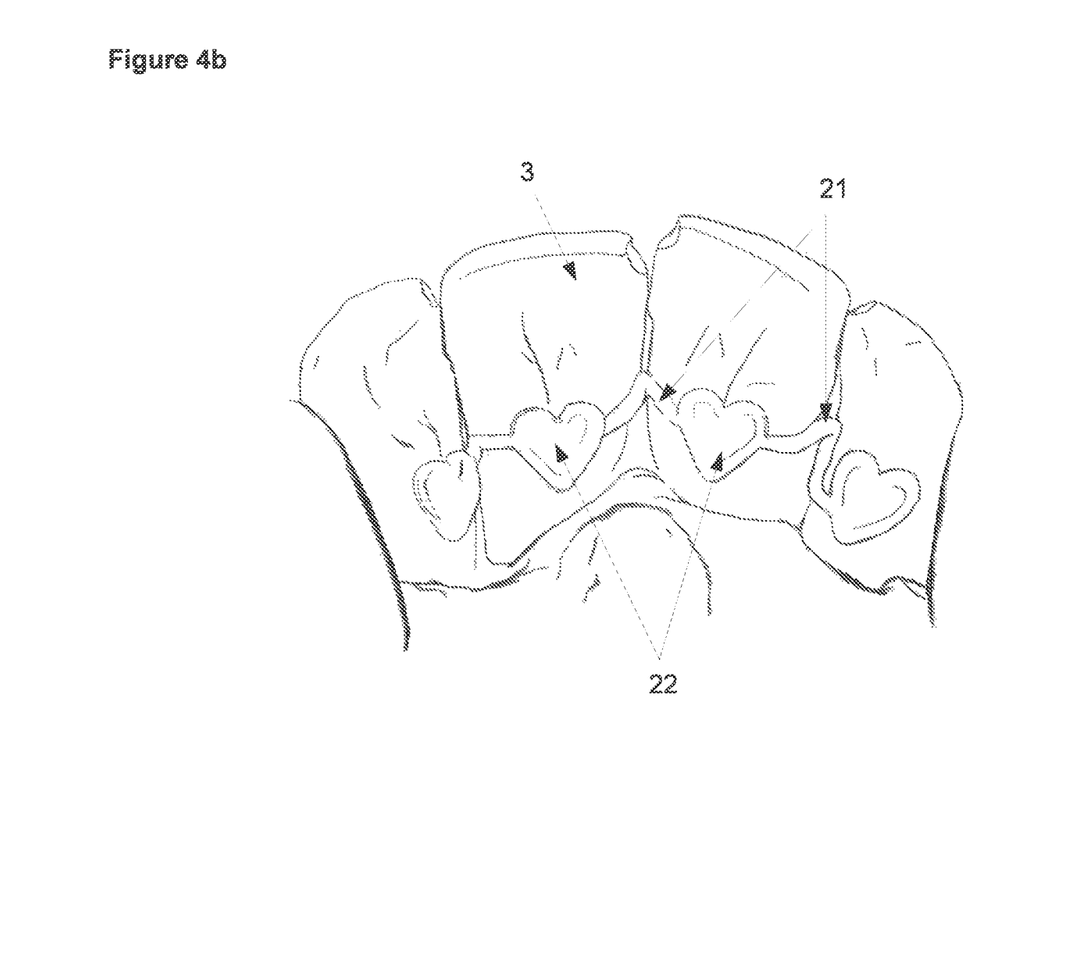
FIG. 4b retainer with fanciful fasteners

In one possible embodiment of the retainer (2), the at least one elongated wire (21) is additionally provided with one or more fastening elements (22) which serve for firmly anchoring the wire (21) to the dentition (FIG. 4a). Depending on the customer request or the requirement of the situation, these fasteners (22) can be designed arbitrarily. In a particular embodiment of the retainer (2), the fastening elements (22) are annular and arranged around the molars. In an alternative embodiment, the fastening elements (22) are regions of the elongated wire (21), which have a larger contact surface with the adjacent tooth (3). This allows a better attachment of the wire (21) to the teeth. In a further embodiment, the fastening elements (22) can assume an imaginative form for decorative or playful purposes, for example for children (FIG. 4b).

Advantageously, the present retainer (2) can have a loop allowing the patient to simply clean the interdentium with dental floss. In addition this can create additional retentions for the bond.

The retainer (2) can also be dyed individually according to customer requests. Again, variations and "gadgets" are possible that delight children and make the insertion of a retainer (2) less "tragic".

Basis of the invention is a method which allows to manufacture a three-dimensional orthodontic retainer (2) as described above with an arbitrary and individual three-dimensional shape, wherein the raw piece (1) is not altered, that is, the nano- or microstructure in the raw piece (1) remains unchanged in the manufactured retainer (2). The inventive method consists essentially of 3 steps (FIG. 5):
1) Creation of a three-dimensional model of the structure of the teeth (3) of the patient
2) Design of an individual accurately fitting model for the retainer (2)
3) Production of the Retainer (2) based on the designed 3D model In possible embodiments of the invention, the method for each of these steps may include one or more subtasks. One possible method for step 1) is:
1) Creation of a three-dimensional model of the structure of the teeth (3) of the patient:
   a) Acquisition of the three-dimensional intraoral structure
   b) Creation of a 3D model of the dentition Step 2) may include one or more of the following subtasks:
2) Design of an individual accurately fitting model of the retainer (2):
   a) Import of the 3D model of the dentition into a CAD software
   b) Design of a 3D model of the retainer (2) on the basis of the 3D model of the dentition
   c) Individualization of the designed 3D model of the retainer (2)

Figure 5:
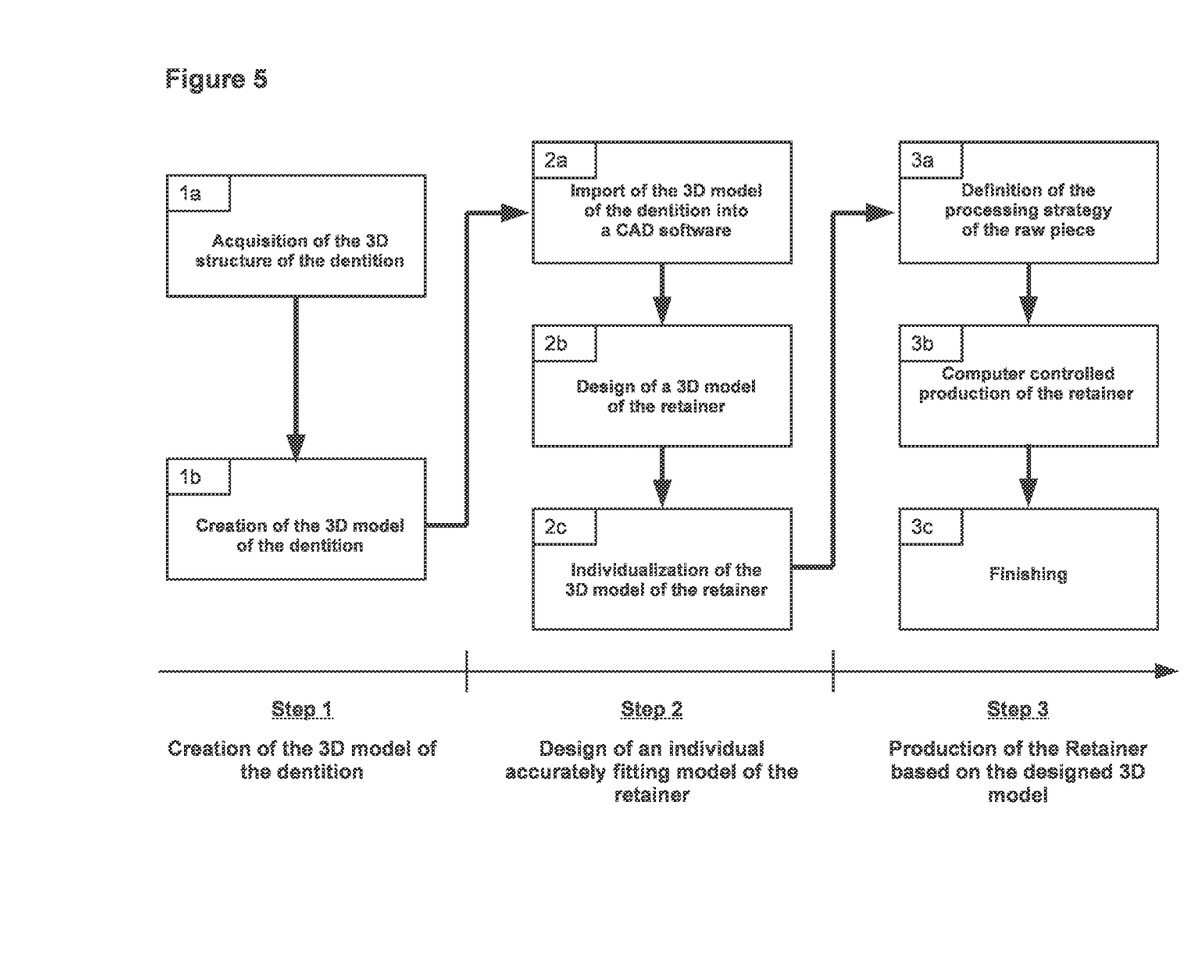
FIG. 5 process flow

Step 3) may include one or more of the following subtasks:
3) Production of the Retainer (2) based on the designed 3D model:

a) definition of the processing strategy of the raw piece (1)
b) computer controlled production of the retainer (2) from the raw piece (1)
c) finishing In the first step 1), the three-dimensional intraoral structure is detected, preferably by means of a non-contact optical imaging method (step 1 a, FIG. 5). This can be done depending on the embodiment of the method using extra-oral or intraoral scanning devices. In extraoral scanning devices such as X-ray machines, the three-dimensional structure of the dentition is determined by digital volume tomography. Intraoral scanning devices have a hand-held probe that can be inserted directly into the patient's mouth, and with which the spatial structure of the dentition is detected by, for example, confocal microscopy, photogrammetry, or interferometry. Compared to conventional dental impression taking with impression trays, these optical methods can offer significant advantages: they are contactless, much faster and significantly more precise. An optical dental impression with accuracy in the micrometer range is detected within a few seconds. If no intraoral scanning device can be used, it is possible to take a classic impression with the impression tray first, and then scan this negative directly or via a positive model made from for example out of plaster. Thereafter, this data is converted into a 3D model of the patient's tooth structure (3), often with included 3D visualization software (step 1 b, FIG. 5).

In the second step 2), the created 3D model is imported into a CAD software (step 2a, FIG. 5) and serves as the basis for the computer-aided design of a 3D model of the retainer (2) according to the tooth structure and dental indication with the above mentioned advantageous features: fit, with adjusted profile, little protrusion by taking advantage of the recesses on the surface of the respective tooth (3), not impacting any occlusal contact points if possible, etc. (Step 2b, FIG. 5). Optionally, once the basic structure of the retainer (2) has been determined, the designed retainer (2) can be additionally personalized according to the customer's request, for example with an imaginative design of the wire (21) or of possible fastening elements (22) (step 2c, FIG. 5).

In the third step 3), the retainer (2) is produced on the basis of the designed CAD model. According to the invention, the retainer (2) is machined in its final form by computer-controlled removal of material from a raw piece (1) made of metal, high-performance ceramics or plastic or another bio compatible material. Alternatively, a retainer of the final shape may also be formed by computer-controlled application of raw material (1), using a suitable adaptive method, such as laser sintering or 3D printing using the same materials. Also material combinations, so-called composites, for example in PEEK (polyether ether ketones), can be used, whereupon different processing tools can be selected depending on the raw material.

Figure 6:
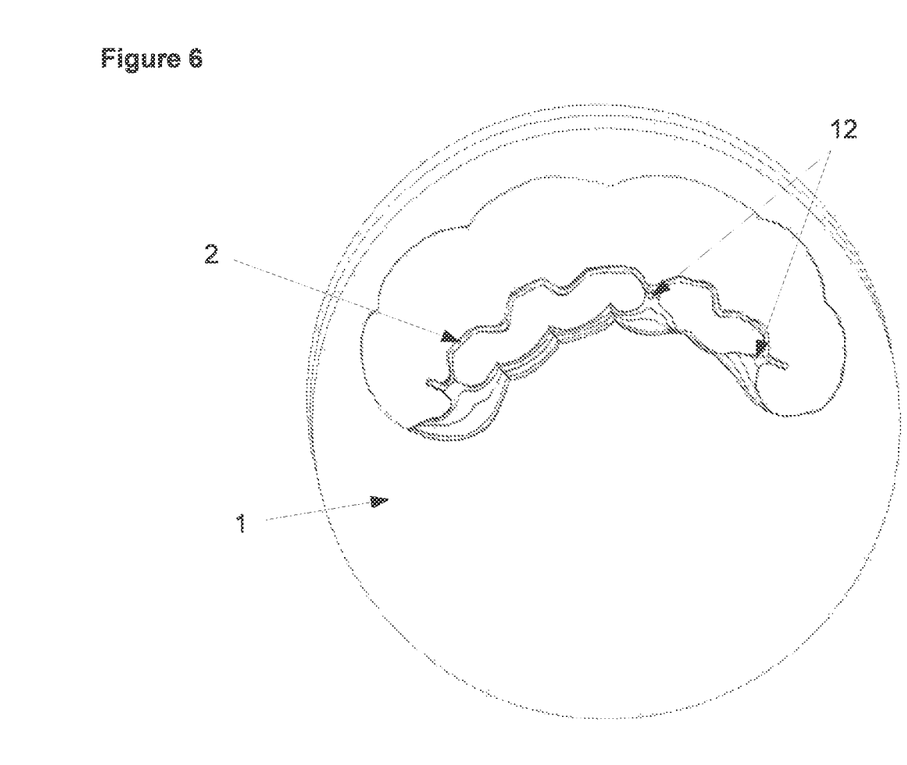
FIG. 6 three-dimensional orthodontic Retainer elaborated in the raw piece

In particularly advantageous embodiments of the method, the removal of the material is carried out by multi-axis machining of the piece of material, for example with the aid of a multi-axis milling machine, water jet cutting machine or laser cutting machine. For this purpose, the machining strategy of the raw piece (1) is determined first (step 3a. FIG. 5). On the one hand, the geometry of the raw piece (1) is taken into account when determining which portion of the raw piece (1) is suitable for the formation of the retainer (2) according to the CAD model, while the surrounding material is removed (FIG. 6). The geometry of the raw piece (1) is ideally chosen so that as little as possible of the material is lost during the preparation of the retainer (2). On the other hand, the exact process of elaboration is defined and the machine programmed accordingly, in particular the milling or cutting speed, the order of the tools used, the holding points and the position of the remaining connection points (12) between the retainer (2) and the raw piece (1) (FIG. 6). When machining the piece of material, it is important that the remaining material is not altered in order to avoid residual stresses, defects such as dislocations and twinning of the crystal lattice and micro-cracks in the material. Due to the small thickness of a finished retainer (2), this is difficult to achieve with the conventional milling or cutting strategies. Therefore, specific milling and cutting strategies are used, such as those developed for the production of thin-walled electronic components. The principles of such strategies are described in the PhD thesis of Michiel Gijsbrecht Roeland Popma ("Computer aided process planning for high-speed milling of thin-walled parts", Universiteit Twente, 2 Jun. 2010).

According to the invention, the material application can be carried out by adaptive methods such as 3D printing or sintering or laser melting. In these methods, the raw material (1) in the form of powder or granules, which has a specific nano- or microstructure, is melted together by the 3D printing or sintering or laser melting process completely or partially. When cooling and curing of the liquid phase, the material recovers its original nano- or microstructure of the solid state. As is the case when material is only removed, these methods have the advantage that the retainer (2) is produced directly into its final form. It is particularly important that the material of the retainer (2) is not altered during the manufacturing process to avoid residual stresses and defects such as dislocations and twinning of the crystal lattice, as well as micro-cracks in the material. Particularly advantageous is the selective laser melting method, because it is well suited for the manufacture of complex objects with a small thickness. The principles of this method are explained in DE 19649865.

After the computer-controlled preparation of the retainer (2) from the raw piece (1) (step 3b, FIG. 5), an additional finishing may be necessary (step 3c, FIG. 5). If the elaborated retainer (2) still has connection points (12) with the raw piece (1) (FIG. 6), these must first be broken, and the retainer (2) must be polished at these points. This may require a certain amount of manual work. To round sharp edges of the retainer (2), in one possible variant of the method, the entire retainer (2) is additionally polished, either manually or electrochemically by placing it in an electrolytic bath. If the retainer (2) consists of a titanium alloy, in a further variant of the method, the electrolytic bath can also be used for coloring the retainer (2). By adjusting the immersion time and the current intensity, any desired color can be achieved.

In one embodiment of the present method, after finishing, an additional check of the manufactured retainer is performed to ensure that it corresponds to the designed 3D model and thus fits with the required accuracy. In order to achieve this, the geometry of the manufactured retainer could be detected using a scanning device and compared with the planned 3D model. Alternatively, a conventional impression of the teeth could be made with an impression tray and from it a model of the teeth (3) is created out of gypsum, allowing the fit of the retainer to be checked before its use in the patient's mouth.

The production method according to the invention has many advantages. First, a retainer (2) of any three-dimensional structure is made from a piece of material in a single process step, which is much simpler, faster, and more economical than previously known methods. Second, this method allows the production of a three-dimensional retainer (2) without altering the raw piece (1). The Retainer (2) is thus made in a purely passive manner, that is, it consists solely of unaffected material whose original nano- or microstructure is unchanged. As a result, residual stresses and nano- or microstructural defects in the retainer (2) are avoided, so that the obtained retainers (2) are more stable and have a longer life cycle. Third, the method of the present invention allows manufacturing a retainer with high accuracy of fit and comfort for the wearer. Fourth, there is also the possibility of customizing the retainer according to customer wishes and creating imaginative forms.

The invention claimed is:

1. Method for producing a three-dimensional orthodontic retainer (2) from a raw piece (1), having at least one elongated wire (21) with a small thickness for connecting and stabilizing two or more adjacent teeth (3), and adjusted to the exact shape of the adjacent teeth (3), each one of the at least one elongated wire (21) includes a cross section having a flat portion and a curved portion, a length of said flat portion is greater than a thickness of said cross section measured from said flat portion to a top of said curved portion, said flat portion is located opposite said curved portion, comprising the following steps:
   1) creation of a three-dimensional model of the structure of the teeth (3) of the patient;
   2) design of an individual accurately fitting model of the retainer (2) running along the local recesses of the surface of the respective tooth (3) and not over protruding zones of the surface of the respective tooth, at a certain height between the base and the upper end of the enamel of the respective tooth (3), this height being different for each tooth and thus not located on the same plane; and
   3) production of the Retainer (2) based on the designed model wherein during step 3) the physical properties of a material of the remaining part of the raw piece (1) are unchanged and identical with respect to the nano- and microstructure in the retainer, and the retainer is elaborated from the raw piece (1) by computer controlled removal of material.

2. Method according to claim 1, wherein the removal of the material is achieved by milling.

3. Method according to claim 1, wherein the removal of the material is achieved by laser treatment.

4. Method according to claim 1, wherein the retainer (2) is polished electrochemically during step 3).

5. Method according to claim 1, wherein the retainer (2) is made of titanium or titanium-alloy.

6. Method according to claim 5, wherein the titanium-alloy is Ti-6AL-4V (Titanium Grade 5 ELI).

7. Method according to claim 5, wherein the titanium-alloy is a shape memory material.

8. Method according to claim 1 wherein the retainer (2) essentially has a curved, flattened or tapered profile, and the flat side of the profile faces the teeth.

* * * * *